(12) United States Patent
Cherukupalli et al.

(10) Patent No.: US 12,525,915 B2
(45) Date of Patent: Jan. 13, 2026

(54) SOLAR PHOTOVOLTAIC ARRAY TRACKER HAVING AXIALLY OFFSET PANEL SECTIONS

(71) Applicant: FTC Solar, Inc., Austin, TX (US)

(72) Inventors: Nagendra Srinivas Cherukupalli, Saratoga, CA (US); Zhijian Zhou, Wuhan (CN); Milo Zabala, Concord, CA (US)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 18/751,497

(22) Filed: Jun. 24, 2024

(65) Prior Publication Data
US 2025/0007448 A1 Jan. 2, 2025

Related U.S. Application Data

(60) Provisional application No. 63/511,365, filed on Jun. 30, 2023.

(51) Int. Cl.
*H02S 20/32* (2014.01)
*H02S 20/10* (2014.01)
*H02S 20/30* (2014.01)

(52) U.S. Cl.
CPC ............ *H02S 20/32* (2014.12); *H02S 20/10* (2014.12); *H02S 20/30* (2014.12)

(58) Field of Classification Search
None
See application file for complete search history.

(56) References Cited

U.S. PATENT DOCUMENTS

| | | | |
|---|---|---|---|
| 11,133,775 B1 * | 9/2021 | LoBue | F16F 9/0254 |
| 2023/0208348 A1 * | 6/2023 | Ballentine | H02S 20/32 |
| | | | 136/251 |
| 2024/0240835 A1 * | 7/2024 | Sokol | F24S 25/634 |

* cited by examiner

*Primary Examiner* — Eli S Mekhlin
(74) *Attorney, Agent, or Firm* — Armstrong Teasdale LLP

(57) ABSTRACT

A solar array row includes a first panel section including a first frame tube and a first photovoltaic panel connected to the first torque tube and a second panel section including a second frame tube and a second photovoltaic panel connected to the second torque tube. The row further includes a drive engaged with the first frame tube and a cabling system including a cable connecting the first panel section to the second panel section. The cable translates rotational force on the first frame tube to the second frame tube such that, when the drive is actuated, the first frame tube rotates about a first rotational axis and the second frame tube rotates about a second rotational axis offset from the first rotational axis.

9 Claims, 8 Drawing Sheets

SOLAR PHOTOVOLTAIC ARRAY TRACKER HAVING AXIALLY OFFSET PANEL SECTIONS

CROSS-REFERENCE TO RELATED APPLICATION

This application claims priority to U.S. Provisional Patent Application No. 63/511,365, filed Jun. 30, 2023, which is incorporated by reference in its entirety.

FIELD

The field relates generally to systems for solar array tracking and, in particular to a solar array tracker that includes offset panel sections.

BACKGROUND

Solar array trackers are used with solar arrays to angle the solar arrays toward the sun. Solar tracking systems typically allow solar panels to follow the sun's path in the sky to produce more solar electricity. Solar array trackers increase the solar panel system's energy production, but are relatively expensive and can significantly increase the cost of installing solar panels. A more cost effective solar array tracker is needed.

SUMMARY

In one aspect, a solar array row includes a first panel section including a first frame tube and a first photovoltaic panel connected to the first torque tube and a second panel section including a second frame tube and a second photovoltaic panel connected to the second torque tube. The row further includes a drive engaged with the first frame tube and a cabling system including a cable connecting the first panel section to the second panel section. The cable translates rotational force on the first frame tube to the second frame tube such that, when the drive is actuated, the first frame tube rotates about a first rotational axis and the second frame tube rotates about a second rotational axis offset from the first rotational axis.

In another aspect, a solar array row includes a first panel section including a first torque tube and a first photovoltaic panel connected to the first torque tube and a second panel section including a second torque tube and a second photovoltaic panel connected to the second torque tub. The row further includes a drive engaged with the first torque tube and a joint assembly including a universal joint connecting the first panel section to the second panel section. The joint assembly translates rotational force on the first torque tube to the second torque tube such that, when the drive is actuated, the first torque tube rotates about a first rotational axis and the second torque tube rotates about a second rotational axis offset from the first rotational axis.

In yet another aspect a solar array row includes a first panel section including a first frame tube and a first photovoltaic panel connected to the first frame tube and a second panel section including a second frame tube and a second photovoltaic panel connected to the second frame tube. The row further includes an axle drive system including a drive, a first axle section engaged with the drive and connected to the first frame tube and a second axle section connected to the first axle section and the second frame tube, wherein actuation of the drive rotates the first axle section and the second axle section and causes the first panel section to rotate about a first rotational axis and the second panel section to rotate about a second rotational axis.

In yet another aspect, a solar array row includes a support column, a solar panel, and a mounting arm pivotably connected to the support column and rotatable about a rotational axis of the solar array row. The mounting arm includes a first section and a second section extending parallel to and offset from the first section. The first section supports the solar panel and the rotational axis extends through the second section.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters and part names indicate corresponding parts throughout the drawings.

DETAILED DESCRIPTION

Figure 1:
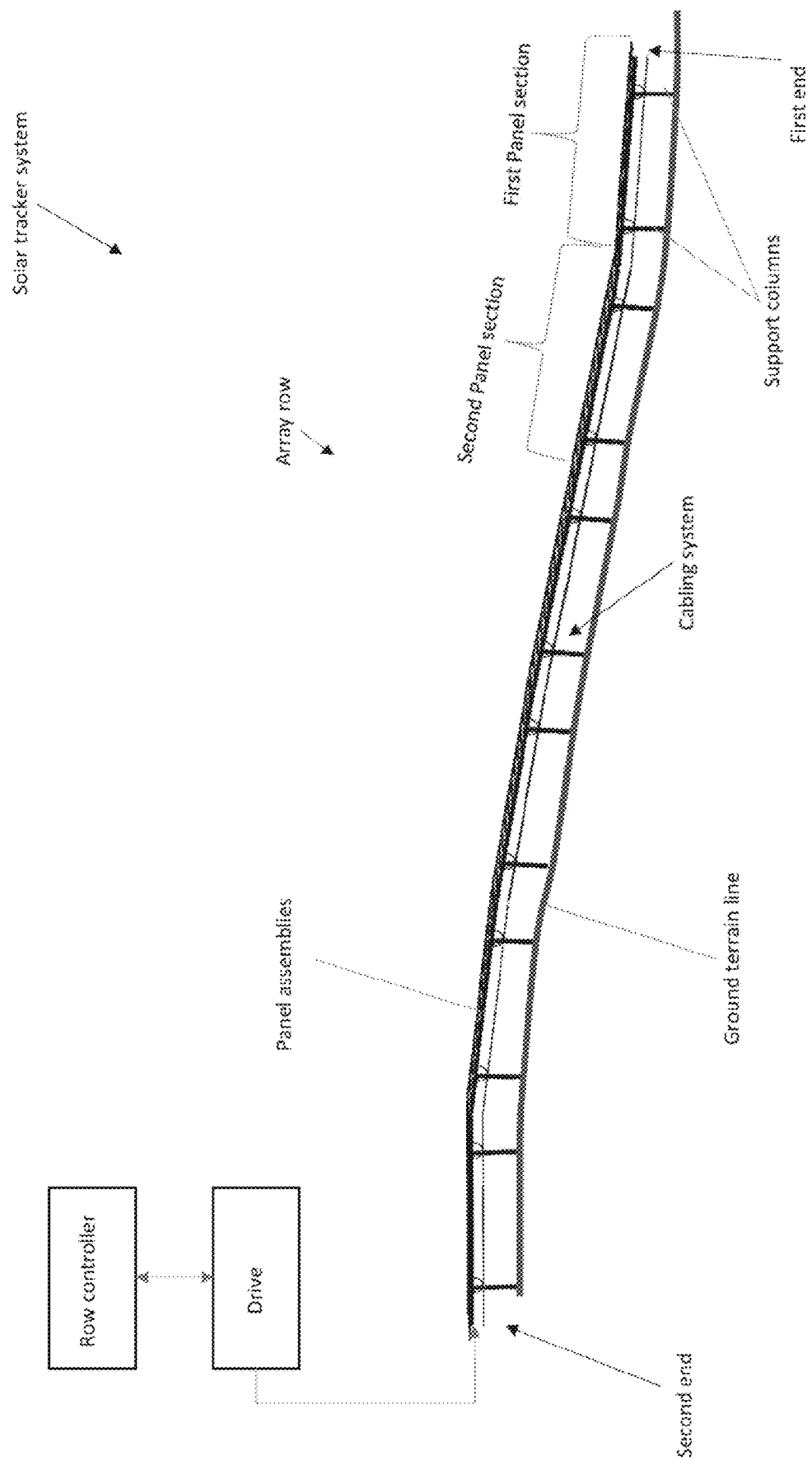
FIG. 1 is a schematic perspective view of an array row of an embodiment of a solar tracker system of this disclosure.

An example embodiment of a solar tracker system including a PV solar array row is shown in FIG. 1. The solar array row is suitably used in a solar power generation system, among other applications. The solar array row is used to generate power, typically in combination with an array of similarly arranged solar array rows (not all array rows are shown). The solar array row includes an array of solar panel assemblies. The solar panel assemblies are rectangular shaped, but the solar panel assemblies may have any other shape that allows the solar array row to function as described herein.

The solar panel assemblies include at least one photovoltaic (PV) array. In other embodiments, the solar panel assemblies may include a thermal collector that heats a fluid such as water. In such embodiments, the panel assemblies may include tubes of fluid which are heated by solar radiation. While the present disclosure describes and shows a photovoltaic array, the principles disclosed are also applicable to a solar array used as a thermal collector unless stated otherwise.

The array row includes a plurality of panel sections that collectively define the array row. Each of the panel sections includes multiple panel assemblies positioned adjacent to one another. A first panel section and a second panel section are identified in FIG. 1, with the solar array row including six panel sections in total. In other embodiments the array row may include any suitable number of panel sections.

Each of the panel sections are supported by a pair of posts or "support columns". In the illustrated embodiment, the support columns are I-beam posts. Other support columns may be used in other embodiments (e.g., a tubular support column). The support columns may be connected to a base, which may include any structure that anchors the row, for example a frame member (e.g., a horizontal rail that the solar panel assemblies with one or more posts securing the rail to the ground), stanchion, ram, pier, ballast, post or the like. The base may also include a foundation which encases a portion of the support columns or may include brackets, fasteners or the like that connect to the support columns.

The solar tracker system also includes a drive that adjusts the position of the panel sections and the solar panel assemblies. The drive directly applies a rotational force to one or more panel sections, which is translated to each of the panel sections by a cabling system of the array row. The drive engages the panel sections such that operation of the drive causes the panel assemblies to pivot relative to the support columns.

In the example embodiment, the drive is shown schematically as operably connected at the second end of the array row, though the drive may be operably connected to the array row at any position along the array row from a first end of the row to a second end of the row. For example, in another embodiment, the drive includes a linear actuator (not shown), such as a screw jack that is connected to a torque tube (shown in FIG. 2), alternatively referred to herein as a "frame tube" of at least one of the panel sections. In this alternative embodiment, the linear actuator engages a beam that is oriented transversely to the torque tube.

The beam is suitably connected to a lever arm mounted to the torque tube for causing a torque force on the torque tube in response to driven movement of the linear actuator, similar to the solar generation apparatus 100 described in U.S. Pat. No. 9,188,367, the entire contents of which are incorporated by reference. In another embodiment, the drive may be a slew drive that is centrally located along the row and operably connected to at least one torque tube of the panel sections. The drive may also include one or more motorized winches that draw and release a cable of the cabling system to rotate the panels sections.

Figure 7:
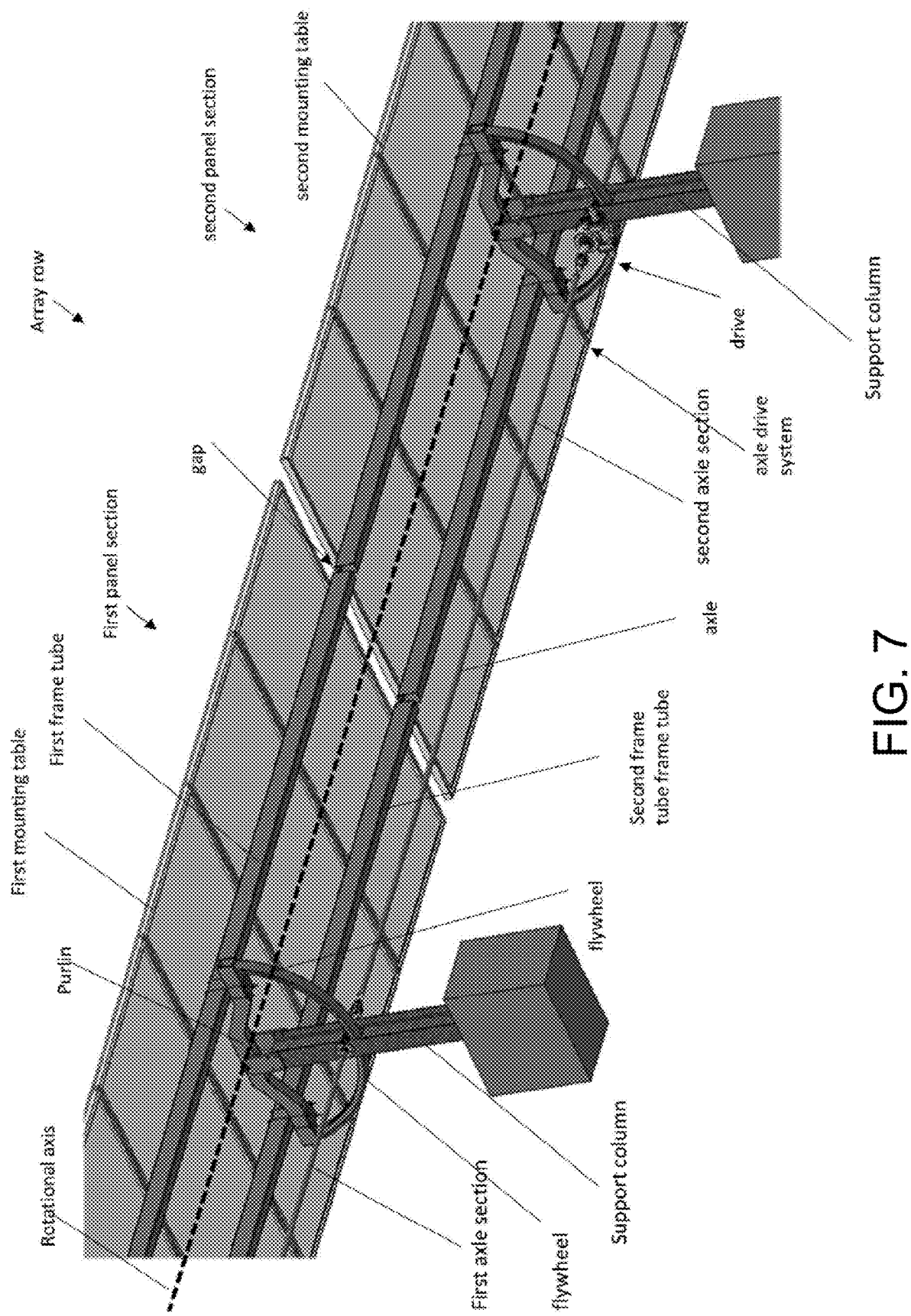
FIG. 7 is a schematic perspective view of a portion of an alternative solar array row for use with the solar tracker system of FIG. 1.
Figure 8:
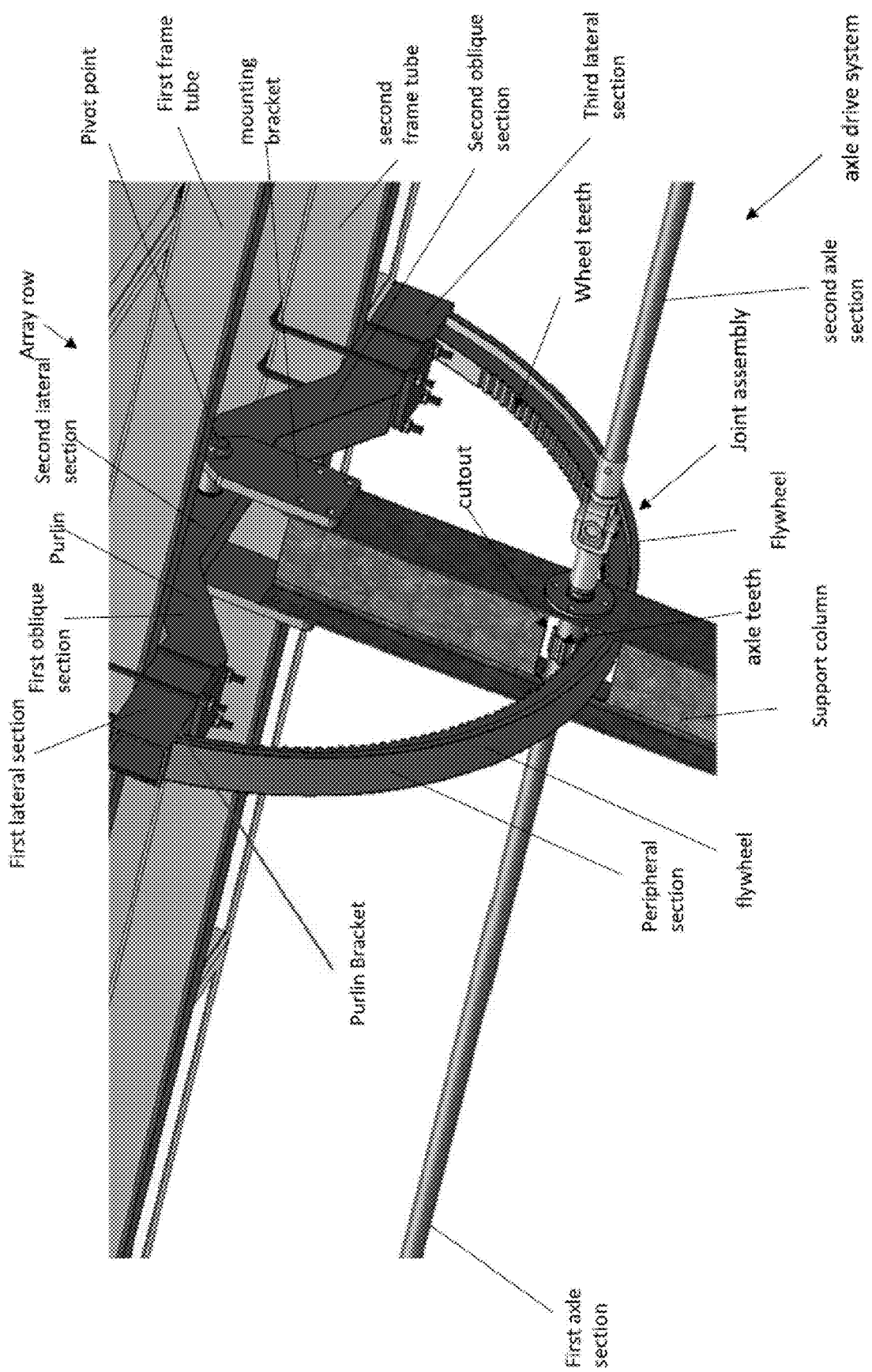
FIG. 8 is another schematic perspective view of the solar array row shown in FIG. 7.

Referring to FIGS. 7 and 8, the drive system includes a contiguous axle rod that is rotated by a centrally located motor along a row. The rod in turn engages a flywheel that is connected to a torque tube or mounting table assembly. The rod rotates the flywheel to rotate the panels of the row.

The solar tracker system of FIG. 1 includes a row controller (shown schematically in FIG. 1) that is electronically connected to the drive and suitably programmed to control operation of the drive. The row controller is positioned, for example, in a controller housing that is mounted on the array row at a location proximate the drive. During operation, the row controller controls the drive to rotate the panel sections such that the panel assemblies follow the path of the sun, such as during movement of the sun over a course of a day, to maximize or optimize the solar power generated by the panels. The row controller suitably positions the panel assemblies based on seasonal variations in the position of the sun.

Figure 2:
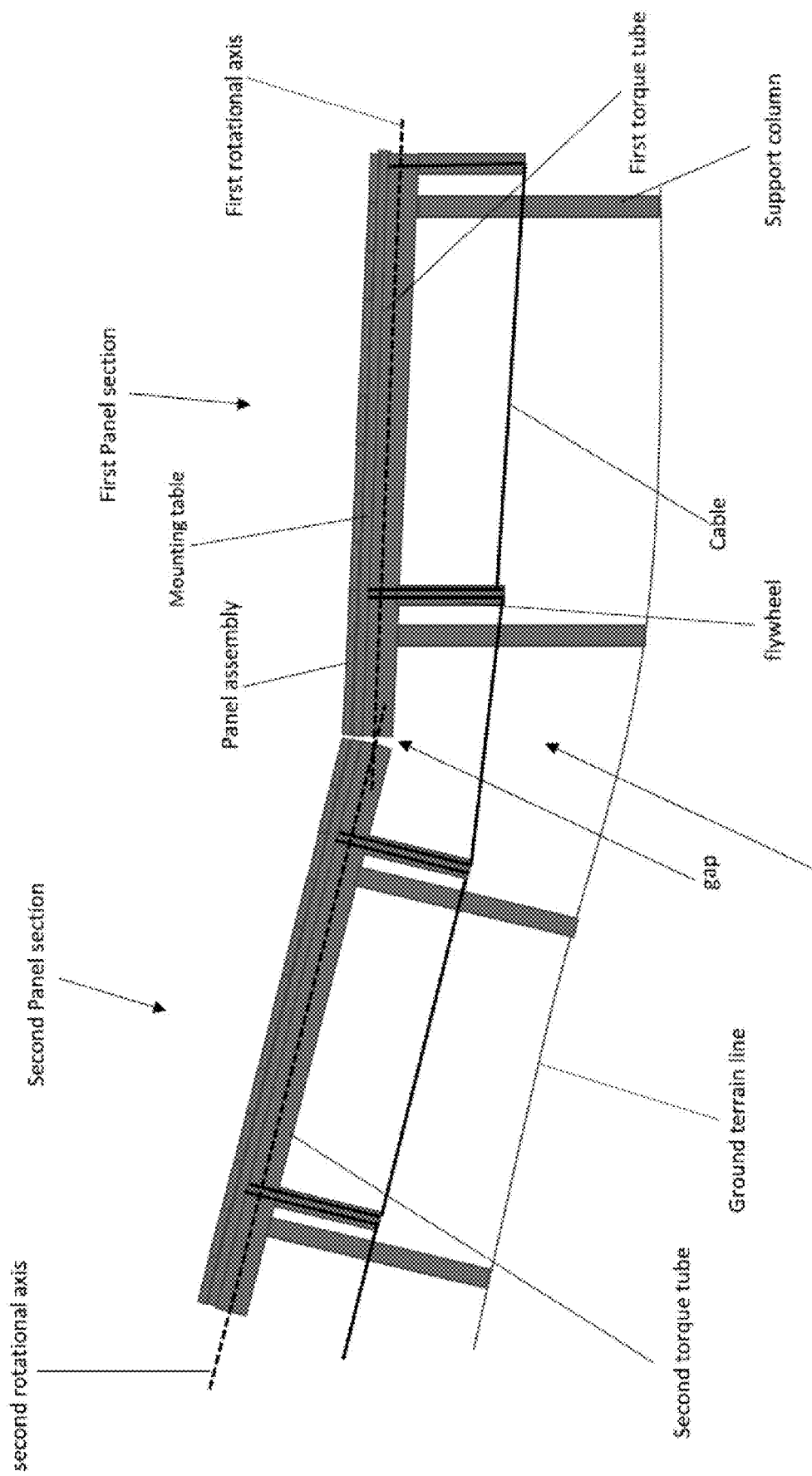
FIG. 2 is an enlarged schematic side view of the array row of FIG. 1.

FIG. 2 is a schematic of the first panel section and the second panel section of the array row shown in FIG. 1. Each of the panel sections includes a respective torque tube to which the solar panel assemblies are connected. The torque tubes are pivotably connected to each of the pair of support columns associated with the corresponding panel section of the row. In this embodiment the torque tubes each have the same length and have a hexagonal profile. The torque tubes alternatively may have any suitable size and shape, and the torque tubes of different panel sections may have different lengths.

The first torque tube and the second torque tube are spaced from one another and are not attached to one another. The first torque tube and the second torque tube define a longitudinal gap therebetween. The first torque tube defines a first rotational axis of the first panel section and the second torque tube defines a second rotational axis of the second panel section that is offset from or noncollinear with the first rotational axis of the first panel section.

The gap between the torque tubes of the adjacent panel sections allows for the different panel sections of the array row to be spatially offset from one another. Having the different panel sections being spatially offset from one another facilitates installing the array row in an area having an uneven ground terrain, as shown in FIGS. 1 and 2, among other advantages. Each torque tube of the different panel sections shown in FIG. 1 is arranged in a similar manner to the first torque tube and the second torque tube shown in FIG. 2.

The cabling system includes at least one cable and flywheels on each of the panel sections. The flywheels are each attached to the torque tubes and connected to the panel assemblies and are positioned adjacent to a corresponding one of the support columns. In the example, the cable includes multiple cables that each extend from one flywheel to the adjacent flywheel. The multiple cables collectively form a chained cable that extends to each one of the panel sections (shown in FIG. 1) and such that actuation of the drive causes each of the torque tubes to rotate about their respective rotational axes. In some embodiments, the cabling system is substantially the same as any one of the cabling systems describes in U.S. patent application Ser. No. 18/067,412 filed Dec. 16, 2022 ("the '412 application") the entire contents of which is incorporated by reference and attached as an appendix.

For example, when the drive is actuated, a torque is applied to the second torque tube, causing rotation of the second torque tube about the second rotational axis. The torque is also translated through the cable system by tension in the cable, such that a torque is also applied to the first panel section, which causes the first torque tube to be rotated about the first rotational axis. When the drive is stopped, a restraining force (e.g., a frictional force) is applied to the torque tube engaged with the drive, which is translated to each of the panel sections, thereby restricting rotational movement of the torque tubes of the separate panel sections.

Figure 3:
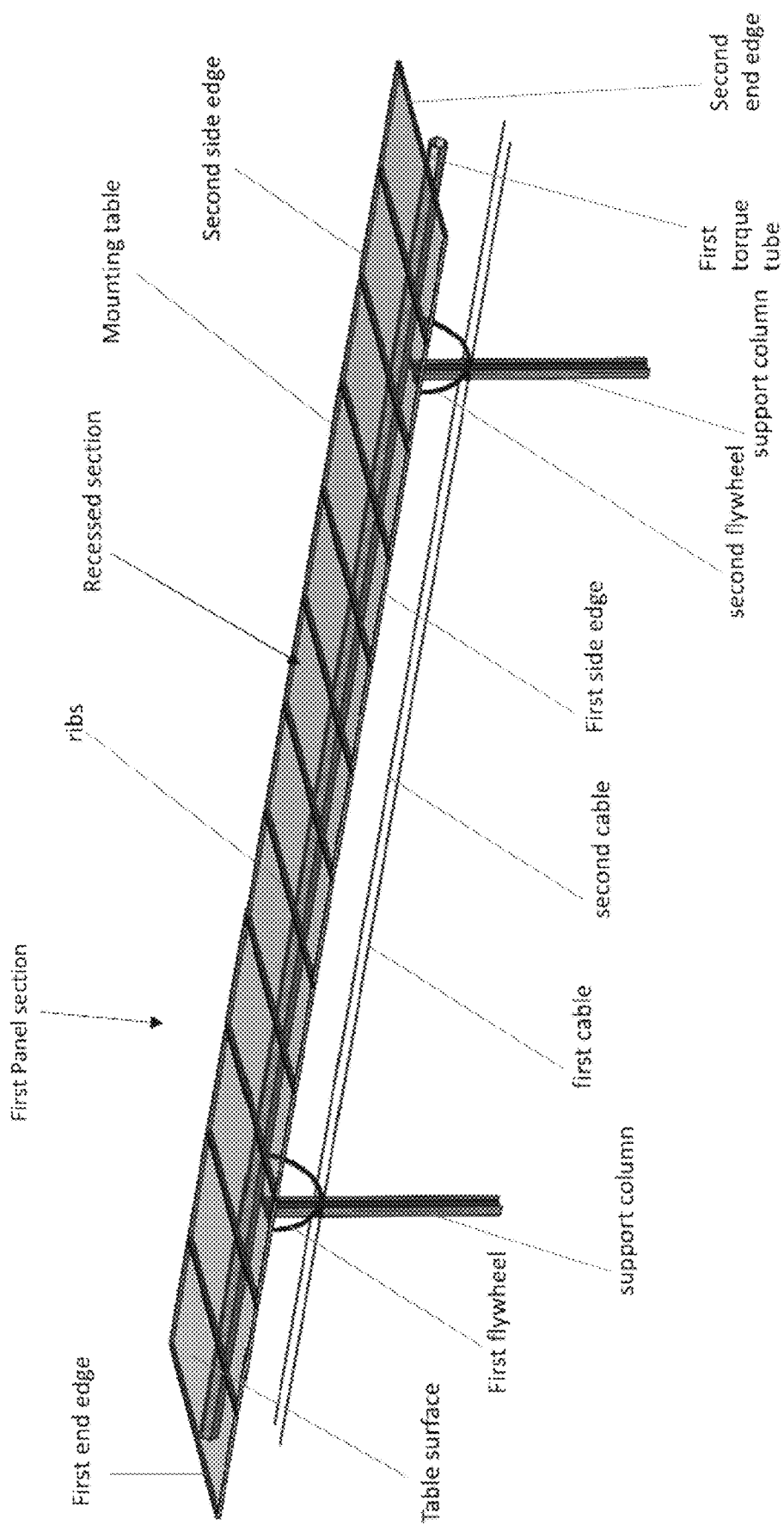
FIG. 3 is a schematic perspective view of a panel section of the array row shown in FIG. 1.

FIG. 3 shows a portion of the first panel section with the solar panel assemblies removed. As shown in FIG. 3, the first panel section includes a mounting table for supporting the panel assemblies connected to the first torque tube. The mounting table has a longitudinal length that is substantially the same as the first torque tube. The mounting table includes first and second end edges and first and second side edges extending between the first and second end edges. The table further includes ribs longitudinally spaced from one another on the table and extending transversely from the side edges. A table surface is recessed relative to the ribs, end edges, and side edges. In this embodiment the table surface is transparent, though in other embodiments the table may have any suitable opacity. The solar panels are positioned on an attached to the table on each of the ribs. Each of the recessed portions of the table is sized complementary with the panel assemblies to receive a panel assembly thereon.

The flywheels are connected to the table to drive rotation of the first torque tube. As shown in FIG. 3, the cable system includes a pair of horizontally overlapped cables, which each extend to different sides of the first panel section. For example, the first cable connects to the table adjacent to the first side edge while the second cable connects to the table proximate the second side edge.

In another embodiment described for example in the '412 application, the cables cross one another between adjacent flywheels, and the first cable is connected to the table adjacent to the first side edge at the first flywheel. The first cable is also connected to the table adjacent to the second side edge at the second flywheel, while the second cable is connected to the table at opposite side edges from the first cable at both the first and second flywheel. The cable system or other components of the solar tracker system may alternatively have a configuration that is the same as any one of the cable systems or portions of the solar tracker systems described in the '412 application, except including separated torque tubes and panel sections as described in the present application.

Figure 4:
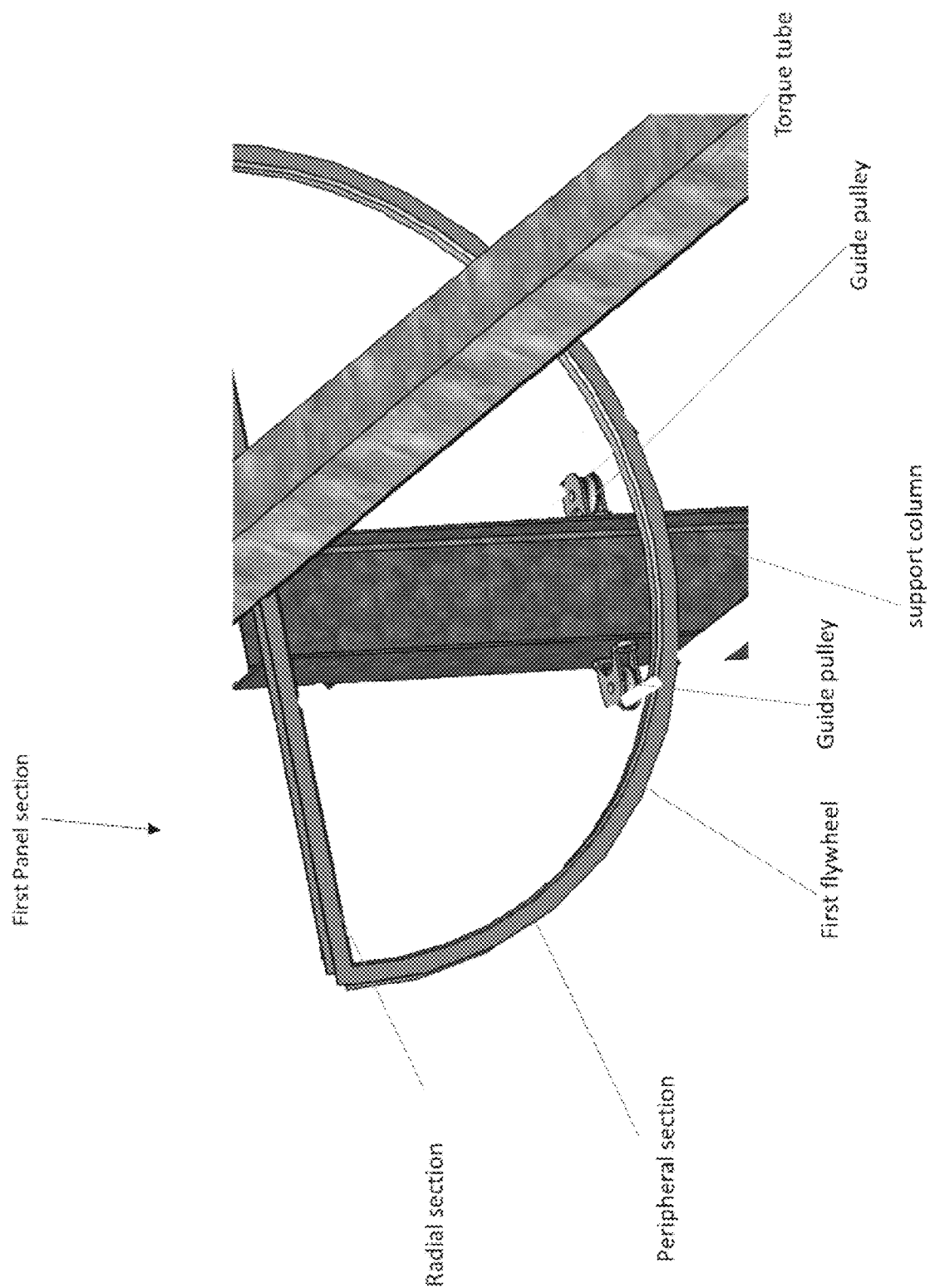
FIG. 4 is a schematic perspective view of a portion of the panel section shown in FIG. 3.

FIG. 4 shows a portion of the first panel section. Specifically, FIG. 4 shows the flywheel, support column, torque tube, and a pair of guide pulleys.

The flywheel includes a peripheral section extending along a generally semicircular arc and a radial section connecting opposed ends of the peripheral section. In the illustrated embodiment the flywheel has a half circle shape, though in other embodiments the flywheel may have any suitable shape.

The guide pulleys are attached to the support column on opposed sides of the support column. The guide pulleys guide the first and second cables (shown in FIG. 3), respectively, to the peripheral section of the flywheel. The peripheral section guides the cables from the pulleys to the mounting table for connection to the mounting table. In some embodiments, a pair of pulleys are provided on each side of the support column (i.e., such that there are four pulleys total attached on each support column) for guiding two cables to each side of the peripheral section of the flywheel. The peripheral section further defines cable tracks (not shown) on an outer surface of the peripheral section that guide the cables along the peripheral section.

Figure 5:
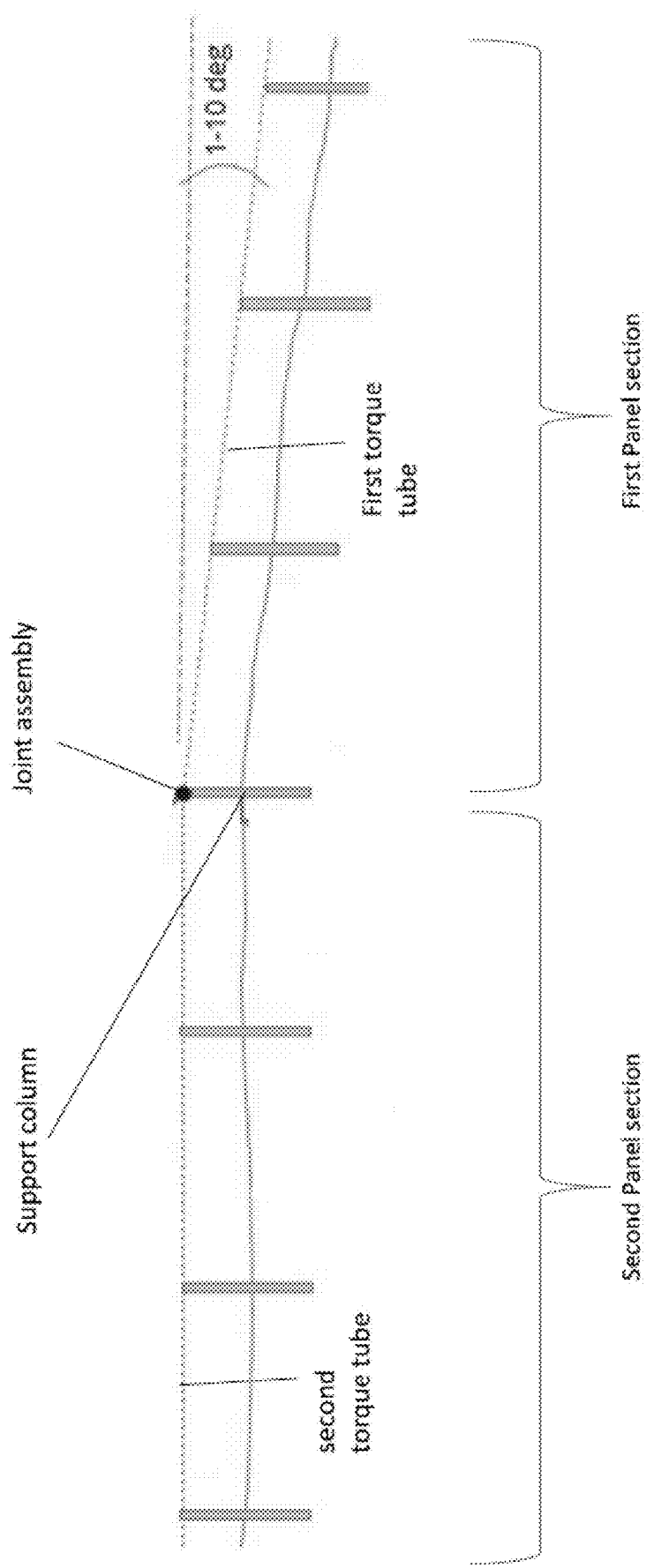
FIG. 5 is a schematic side view of an alternative array row for use with the solar tracker system of FIG. 1.

FIG. 5 shows a schematic of an alternative solar array row for use with the solar tracker system shown in FIG. 1. The row of FIG. 5 is substantially the same as the row shown in FIGS. 1-4 except as otherwise described differently herein. In particular, the row of FIG. 5 includes a first panel section having a first torque tube and a second panel section having a second torque tube that are able to be arranged on uneven ground terrain with offset rotational axes. However, in the example embodiment, the row does not include the cable system described above with respect to FIG. 1. Rather, the row includes a joint assembly, such as a universal joint or "U-joint", connecting the first torque tube to the second torque tube for translating rotation between the panel sections. The joint allows for an angular offset of between one to ten degrees between the connected torque tubes. The joint assembly is positioned at or near the support column, which provides support to the joint assembly and the tubes against sagging of the tube.

Solar panel assemblies (not shown) are attached to the torque tube using mounting tables in substantially the same manner as described above with respect to the solar array row of FIG. 3. In other embodiments, the panels are mounted to the torque tube using rails attached to the torque tube and clips which secure the panels on the rails.

Figure 6:
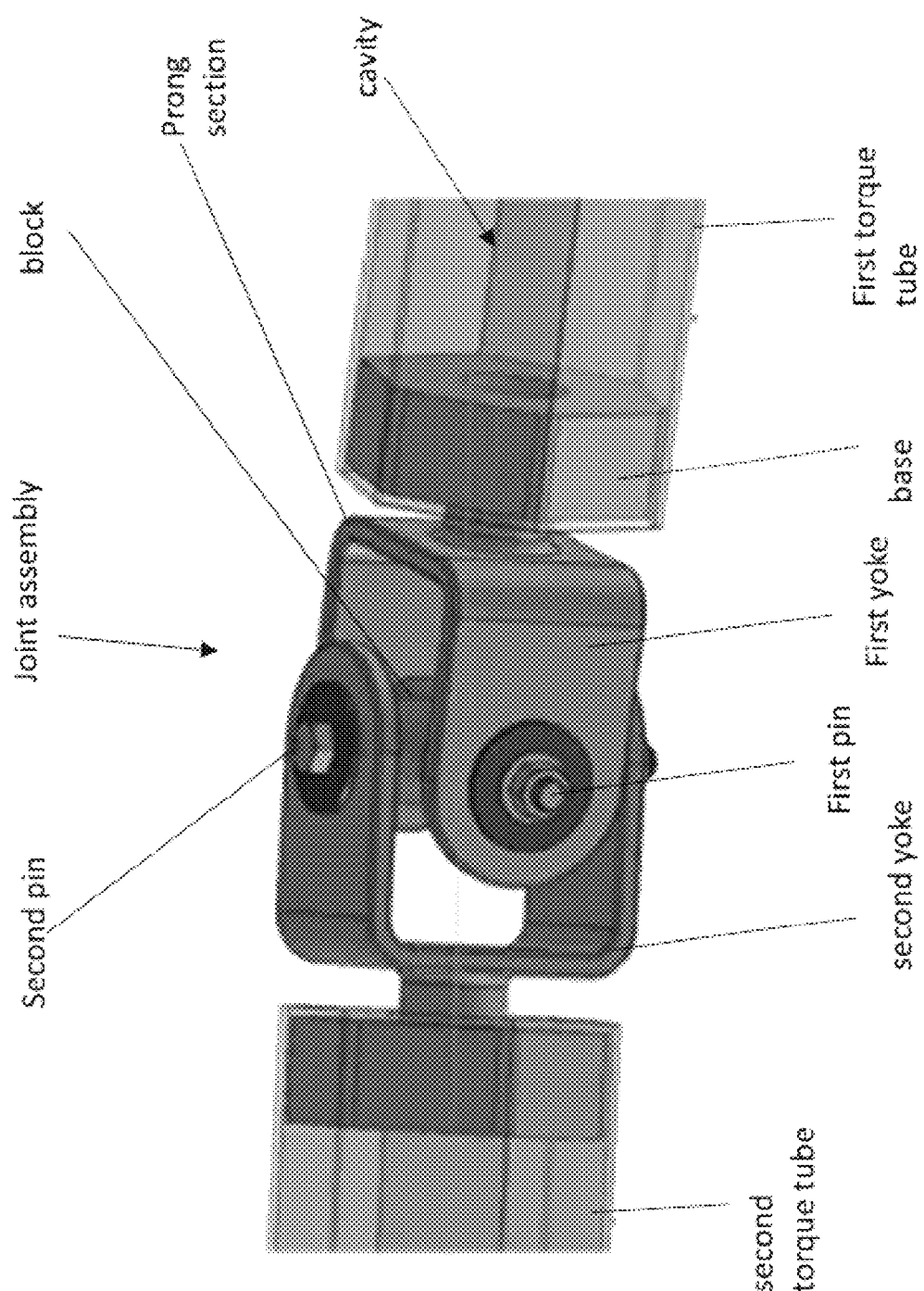
FIG. 6 is a schematic perspective view of a joint assembly of the array row shown in FIG. 5.

Referring to FIG. 6, the joint assembly includes a first yoke, a second yoke, and a block positioned between the first yoke and the second yoke. The first yoke and second yoke each include a base, which is received in a cavity defined in the first torque tube and the second torque tube, respectively. The bases of this embodiment are fixedly attached to the torque tubes, though components may be removable or otherwise made to facilitate ease of assembly. The first yoke and second yoke each have a prong section attached to the base and oriented at an approximately 90 degrees offset relative to one another. The block is positioned between the prong sections of the first yoke and the second yoke. The block includes at least two openings (not shown) that are positioned to receive first and second pins of the joint assembly therethrough. In particular, a first pin is fastened to the prong section of the first yoke and extends through a first opening (not shown) defined in the block. A second pin is fastened to the prong section of the second yoke and extends through a second opening (not shown) in the block. In other embodiments, other types of joints may be used or constructed to facilitate ease of assembly.

The joint assembly facilitates offsetting the torque tubes of the row, as shown in FIG. 5, while translating rotational forces between the torque tubes. For example, as the second torque tube is rotated, the second yoke rotates the block due to engagement with the block by the second pin. Rotation of the block further rotates the first yoke and the first torque tube. The joint assembly allows for up to ten degrees of angular offset between the adjacent torque tubes, though in other embodiments, the joint assembly may facilitate an increased angular offset between the tubes.

FIG. 7 shows a schematic of a portion of an alternative solar array row for use with the solar tracker system shown in FIG. 1. The row is substantially the same as the row described above with respect to FIGS. 1-4 except that, in the example embodiment, the row does not include a cabling system driving adjacent panel sections of the row. Rather the row includes an axle drive system that connects the adjacent sections of the row and drives rotational movement of the row.

Additionally, unlike the row shown in FIGS. 1-4, the row of FIG. 7 does not include a singular torque tube that is positioned along a rotational axis. Rather the panel sections of the row each include a pair of frame tubes that are laterally offset from a rotational axis of the row and which are connected to the support column by a purlin. The frame tube and purlin arrangement of the row may alternatively be used on any of the other solar array rows of FIGS. 1-6.

As shown in FIG. 7, the first panel section and the second panel section define a lateral gap therebetween. The first and second frame tubes of the first panel section are separated by the gap from the first and second frame tubes of the second panel section. The first panel section and second panel section further include first and second mounting tables, respectively, which are separated by the gap. The mounting tables support solar panel assemblies (not shown) thereon and are substantially the same as the mounting tables described above with respect to FIG. 3, apart from being connected to the frame tubes.

The axle drive system includes a drive connected to one of the support columns and an axle that is parallel to and offset from (i.e., offset in a vertically lowered position from) the rotational axis of the row. The axle includes multiple axle sections (first and second axle sections shown in FIG. 7) which collectively define a length of the axle extending the length of the row. The drive rotates the axle about an axis extending along the length of the axle. The axle is engaged with the flywheels of the row such that rotation of the axle causes the flywheel and purlins to pivot on the support columns, thereby rotating the row.

Referring to FIG. 8, the row includes a mounting bracket attached to the support column and the purlin is pivotably mounted to the mounting bracket, and pivotably connected to the support column, for rotation of the purlin about a pivot point. The pivot point defines the rotational axis (shown in FIG. 7) of at least the corresponding panel section of the row. Where the panel sections are offset from one another different panel sections may define different rotational axes. The row further includes a pair of purlin brackets positioned at opposed lateral ends of the purlin which attach the purlin to the first frame tube and the second frame tube, respectively.

As shown in FIG. 8, the purlin (also referred to herein as a "mounting arm") includes a first lateral section, a second lateral section offset from (i.e., raised relative to) the first lateral section and extending parallel to the first lateral section. The mounting arm further includes a third lateral section that is coplanar with the first lateral section. The purlin further includes a first oblique section and a second oblique section that are each oriented obliquely to the lateral sections. The first oblique section connects the first lateral section to the second lateral section and the second oblique section connects the second lateral section to the third lateral section. The second lateral section defines an aperture therein, through which the pivot point extends.

The purlin is shaped such that the first frame tube is attached to a top side of the first lateral section and the second frame tube is attached to a top side of the third lateral section, with the second lateral section being positioned at least partially coplanar with the first frame tube and the second frame tube. The second lateral section is positioned above the first and third lateral sections when the row is in a flat orientation (i.e., such that the panels are oriented generally perpendicular to the support column). The rotational axis extends through the second lateral section. The second lateral section is positioned at least partially within a plane extending through the first frame tube and the second frame tube. The purlin thereby supports the frame tubes while defining a center of rotation of the row (e.g., as defined by the pivot point) that is positioned at a raised offset from the sections of the purlin supporting the frame tubes. As a result, the torque requirements to rotate the row may be reduced relative to rows using a singular torque tube configuration.

Referring to FIG. 8, the axle drive system includes a first axle section, a second axle section, and a joint assembly connecting the first axle section to the second axle section. The joint assembly is substantially the same as the joint assembly shown and described with respect to FIG. 6, except that the joint assembly of FIG. 8 connections the axle sections as opposed to torque tube sections. The joint assembly is pivotable about at least one axis, allowing for angular offset positioning of the axle sections, and thereby the row sections.

The support column defines a cutout therein through which the axle and the flywheel extend. The axle extends longitudinally through the cutout while the flywheel extends generally laterally through the cutout. The first axle section defines teeth on an outer periphery of the first axle section which are engaged with corresponding teeth of the flywheel. The flywheel teeth are defined on an inner surface of the peripheral section of the flywheel. The axle teeth and flywheel teeth are positioned within the cutout and rotation of the axle drives rotation of the flywheel, thereby rotating the row about the rotational axis (shown in FIG. 7). As shown in FIG. 8, the flywheel is integrally formed with the purlin. In other embodiments, the purlin and the flywheel are formed as separate components and the flywheel is attached to the purlin.

The purlin shown in FIGS. 7 and 8 may be used with other solar array rows. For example, in some embodiments, the solar array row does not include the axle drive system and instead includes a central tube drive (e.g., a torque tube driven by a slew drive), with the central tube extending along the rotational axis of the solar array row, intersecting the purlin at the second lateral section. Additionally or alternatively, the purlin may support two or more laterally adjacent panels (also referred to as a "2P configuration"). Components of any embodiments of solar array rows described herein may be additionally or alternatively used with any of the other components of solar array rows described herein unless otherwise stated.

The above systems and methods are suitably electronically and/or computer controlled, but are not limited to any particular system controller or processor for performing the processing tasks described. The term "controller" or "processor", as used herein, is intended to denote any machine capable of performing the calculations, or computations, necessary to perform the tasks described herein. The terms "controller" and "processor" also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the disclosure, as will be understood by those skilled in the art. The terms "controller" and "processor", as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A solar array row comprising:
   a first panel section including a first frame tube and a first photovoltaic panel connected to the first frame tube;
   a second panel section including a second frame tube and a second photovoltaic panel connected to the second frame tube;
   a drive engaged with the first frame tube; and
   a cabling system including a cable connecting the first panel section to the second panel section, the cable translating rotational force on the first frame tube to the second frame tube such that, when the drive is actuated, the first frame tube rotates about a first rotational axis and the second frame tube rotates about a second rotational axis offset from the first rotational axis.

2. The solar array row of claim 1, wherein the first panel section further includes a table connected to the first frame tube, the first photovoltaic panel being attached to the table.

3. The solar array row of claim 1 further comprising a support column and a purlin pivotably connected to the support column and attached to the first frame tube.

4. The solar array row of claim 1 further comprising:
   a joint assembly including a universal joint connecting the first panel section to the second panel section, the joint assembly translating rotational force on the first frame tube to the second frame tube such that, when the drive is actuated, the first frame tube rotates about the first rotational axis and the second frame tube rotates about the second rotational axis.

5. A solar array row comprising:
   a support column;
   a solar panel;
   a mounting arm pivotably connected to the support column and rotatable about a rotational axis of the solar array row, the mounting arm comprising:
      a first section; and
      a second section extending parallel to and offset from the first section, wherein the first section supports the solar panel and the rotational axis extends through the second section;
   a first panel section including a first frame tube, wherein the solar panel is connected to the first frame tube;
   a second panel section including a second frame tube and an additional solar panel connected to the second frame tube;
   a drive engaged with the first frame tube; and
   a cabling system including a cable connecting the first panel section to the second panel section, the cable translating rotational force on the first frame tube to the second frame tube such that, when the drive is actuated, the first frame tube rotates about the rotational axis and the second frame tube rotates about a different rotational axis offset from the rotational axis.

6. The solar array row of claim 5, wherein the mounting arm further comprises an oblique section connecting the first section to the second section, the oblique section being obliquely oriented to the first section and the second section.

7. The solar array row of claim 5, wherein the second section is positioned above the first section when the solar array row is in a flat orientation.

8. The solar array row of claim 5 further comprising:
   a joint assembly including a universal joint connecting the first panel section to the second panel section, the joint assembly translating rotational force on the first frame tube to the second frame tube such that, when the drive is actuated, the first frame tube rotates about the rotational axis and the second frame tube rotates about the different rotational axis.

9. The solar array row of claim 8, wherein the mounting arm comprises a purlin pivotably connected to the support column and attached to the first frame tube.

* * * * *